(12) United States Patent
Calvignac et al.

(10) Patent No.: US 7,293,158 B2
(45) Date of Patent: Nov. 6, 2007

(54) SYSTEMS AND METHODS FOR IMPLEMENTING COUNTERS IN A NETWORK PROCESSOR WITH COST EFFECTIVE MEMORY

(75) Inventors: Jean Louis Calvignac, Raleigh, NC (US); Chih-jen Chang, Apex, NC (US); Joseph Franklin Logan, Raleigh, NC (US); Fabrice Jean Verplanken, LaGaude (FR)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 11/070,060

(22) Filed: Mar. 2, 2005

(65) Prior Publication Data

US 2006/0209827 A1 Sep. 21, 2006

(51) Int. Cl.
*G06F 15/00* (2006.01)
*G06F 12/00* (2006.01)
(52) U.S. Cl. .......................... 712/1; 711/155
(58) Field of Classification Search ................ 711/155; 708/672, 273; 712/1
See application file for complete search history.

(56) References Cited

U.S. PATENT DOCUMENTS

| | | | |
|---|---|---|---|
| 4,198,699 A | 4/1980 | Caddell | |
| 5,317,745 A | 5/1994 | Chan | |
| 5,568,445 A | 10/1996 | Park et al. | |
| 5,577,238 A | 11/1996 | Cuny et al. | |
| 5,915,104 A | 6/1999 | Miller | |
| 6,147,926 A | 11/2000 | Park | |
| 6,360,307 B1 * | 3/2002 | Raftery et al. | 711/169 |
| 6,397,274 B1 | 5/2002 | Miller | |
| 6,434,674 B1 | 8/2002 | DeWilde et al. | |
| 6,697,371 B1 * | 2/2004 | Liang et al. | 370/401 |
| 2002/0122386 A1 * | 9/2002 | Calvignac et al. | 370/230 |
| 2002/0161967 A1 | 10/2002 | Kirihata et al. | |

OTHER PUBLICATIONS

"IBM PowerNP network processor: Hardware, software, and applications"; J. R. Allen, Jr., et al.; Mar. 2003.*
Kwasnik, R. F., "Minimization of Latency in Serial Memories," IBM Technical Disclosure Bulletin, vol. 23, No. 6, Nov. 1980, pp. 2389-2390.

* cited by examiner

*Primary Examiner*—Donald Sparks
*Assistant Examiner*—Benjamin P. Geib
(74) *Attorney, Agent, or Firm*—Joscelyn G. Cockburn; Schubert Osterrieder & Nickelson PLLC

(57) ABSTRACT

Systems and methods for implementing counters in a network processor with cost effective memory are disclosed. Embodiments include systems and methods for implementing counters in a network processor using less expensive memory such as DRAM. A network processor receives packets and implements accounting functions including counting packets in each of a plurality of flow queues. Embodiments include a counter controller that may increment counter values more than once during a R-M-W cycle. Each time a counter controller receives a request to update a counter during a R-M-W cycle that has been initiated for the counter, the counter controller increments the counter value received from memory. The incremented value is written to memory during the write cycle of the R-M-W cycle. A write disable unit disables writes that would otherwise occur during R-M-W cycles initiated for the counter during the earlier initiated R-M-W cycle.

20 Claims, 5 Drawing Sheets

SYSTEMS AND METHODS FOR IMPLEMENTING COUNTERS IN A NETWORK PROCESSOR WITH COST EFFECTIVE MEMORY

FIELD

The present invention is in the field of digital processing. More particularly, the invention is in the field of accessing cost effective memory to update counters in a network processor.

BACKGROUND

Many different types of computing systems have attained widespread use around the world. These computing systems include personal computers, servers, mainframes and a wide variety of stand-alone and embedded computing devices. Sprawling client-server systems exist, with applications and information spread across many PC networks, mainframes and minicomputers. In a distributed system connected by networks, a user may access many application programs, databases, network systems, operating systems and mainframe applications. Computers provide individuals and businesses with a host of software applications including word processing, spreadsheet, accounting, e-mail, voice over Internet protocol telecommunications, and facsimile.

In today's networked world, bandwidth is a critical resource. Very high network traffic, driven by the Internet and other emerging applications, is straining the capacity of network infrastructures. To keep pace, organizations are looking for better ways to support and manage traffic growth and the convergence of voice with data. Today's dramatic increase in network traffic can be attributed to the popularity of the Internet, a growing need for remote access to information, and emerging applications. The Internet alone, with its explosive growth in e-commerce, has placed a sometimes insupportable load on network backbones. The growing demands of remote access applications, including e-mail, database access, and file transfer, are further straining networks.

Eliminating network bottlenecks continues to be a top priority for service providers. Routers are often the source of these bottlenecks. However, network congestion in general is often misdiagnosed as a bandwidth problem and is addressed by seeking higher-bandwidth solutions. Today, manufacturers are recognizing this difficulty. They are turning to network processor technologies to manage bandwidth resources more efficiently and to provide the advanced data services, at wire speed, that are commonly found in routers and network application servers. These services include load balancing, QoS, gateways, fire walls, security, and web caching.

A Network Processor (NP) may be defined as a programmable communications integrated circuit capable of performing one or more of the following functions:
- Packet classification—identifying a packet based on known characteristics, such as address or protocol
- Packet modification—modifying the packet to comply with IP, ATM, or other protocols (for example, updating the time-to-live field in the header for IP)
- Queue/policy management—reflects the design strategy for packet queuing, de-queuing, and scheduling of packets for specific applications
- Packet forwarding—transmission and receipt of data over the switch fabric and forwarding or routing the packet to the appropriate address Although this definition accurately describes the basic features of early NPs, the full potential capabilities and benefits of NPs are yet to be realized. Network processors can increase bandwidth and solve latency problems in a broad range of applications by allowing networking tasks previously handled in software to be executed in hardware. In addition, NPs can provide speed improvements through certain architectures, such as parallel distributed processing and pipeline processing designs. These capabilities can enable efficient search engines, increase throughput, and provide rapid execution of complex tasks.

Network processors are expected to become the fundamental network building block for networks in the same fashion that CPUs are for PCs. Typical capabilities offered by an NP are real-time processing, security, store and forward, switch fabric, and IP packet handling and learning capabilities. The processor-model NP incorporates multiple general purpose processors and specialized logic. Suppliers are turning to this design to provide scalable, flexible solutions that can accommodate change in a timely and cost-effective fashion. A processor-model NP allows distributed processing at lower levels of integration, providing higher throughput, flexibility and control. Programmability can enable easy migration to new protocols and technologies, without requiring new ASIC designs.

A network processor comprises circuitry to perform accounting functions, usually by implementing an accounting module in a data flow unit within the network processor. The accounting module counts packets for a very large number of flow queues. To perform a count, the network processor reads a current counter value corresponding to a flow queue from a memory location associated with the counter. The network processor increments the current counter value by one to produce a new counter value. The network processor then stores the new counter value back into the memory location that holds the current counter value. Because a very large number of packets are counted for a very large number of flows, a large amount of memory is required to store the counter values.

Because a large amount of memory is required, implementation of counters with relatively inexpensive memory is desirable. More particularly, because DRAM (Dynamic Random Access Memory) is inexpensive relative to the cost of higher speed memory such as SRAM (Static RAM), implementation of counter memories in DRAM is desirable. However, long latency memory such as DRAM produces an obstacle to counting packets at the packet reception rate of the network processor. The Read-Modify-Write cycle for long latency memory may be longer than the counter update rate. Thus, methods and systems for implementing counters in a network processor using cost effective, relatively long latency memory are needed.

SUMMARY

The problems identified above are in large part addressed by systems and methods disclosed herein for implementing counters in a network processor using cost effective memory with relatively long latency accesses. Embodiments implement a counting mechanism comprising a plurality of address registers sequentially connected to form an address pipeline to sequentially receive addresses. Each received address gives a memory location where a counter value is stored. The address pipeline comprises a register that outputs a received address as a read address at a beginning of the address pipeline and a register that outputs the address as a write address at an end of the pipeline. The counting mechanism comprises a plurality of comparators to perform address comparisons to determine if the write address matches one or more addresses in the address registers of the address pipeline. A counter value modifier increments a value read from the memory location indicated by the read address once plus once for each address match determined by the comparators. This produces an updated counter value to write to memory.

In one embodiment, a network processor for processing packets of data comprises a data flow unit to receive packets of data, and for each packet, to determine a flow queue to which the packet belongs, and to transmit processed packets. The network processor further comprises an embedded processors complex comprising a plurality of processors to process packets of data. A counter is provided for counting packets received in each of a plurality of flow queues. The counter comprises an address pipeline for receiving counter value addresses and issuing an address as a read address at a first stage of the pipeline and as a write address at a later stage of the pipeline. The counter further comprises a plurality of comparators to perform address comparisons to determine if the write address matches one or more addresses in the address registers of the address pipeline. A counter value modifier increments the value read from the memory location in the counter value memory indicated by the read address once plus once for each address match determined by the comparators to produce an incremented counter value.

Another embodiment is a method for accounting in a network processor, comprising forming an address pipeline with a plurality of address registers and sequentially receiving into the address registers of the address pipeline a sequence of counter value addresses. The method comprises issuing a received counter value address as a read address in one stage of the address pipeline and as a write address in a later stage of the address pipeline. A counter value is read from a memory location indicated by the read address. The method comprises determining by a comparator for each of a plurality of stages in the pipeline, an address that matches the write address. The counter value read from memory is incremented at least once plus once for each match determined. The incremented counter value is written to the memory location.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Embodiments include systems and methods for implementing counters in a network processor using less expensive memory such as DRAM. A network processor receives packets and implements accounting functions including counting packets in each of a plurality of flow queues. The Read-Write-Modify (R-M-W) cycle of DRAM is longer than the packet reception rate of the network processor. To implement counters using long latency memory, embodiments include a counter controller that may increment counter values more than once during a R-M-W cycle. Each time a counter controller receives a request to update a counter during a R-M-W cycle that has been initiated for the counter, the counter controller increments the counter value received from memory. The incremented value is written to memory during the write cycle of the R-M-W cycle. A write disable unit disables writes that would otherwise occur during R-M-W cycles initiated for the counter during the earlier initiated R-M-W cycle.

Figure 1:
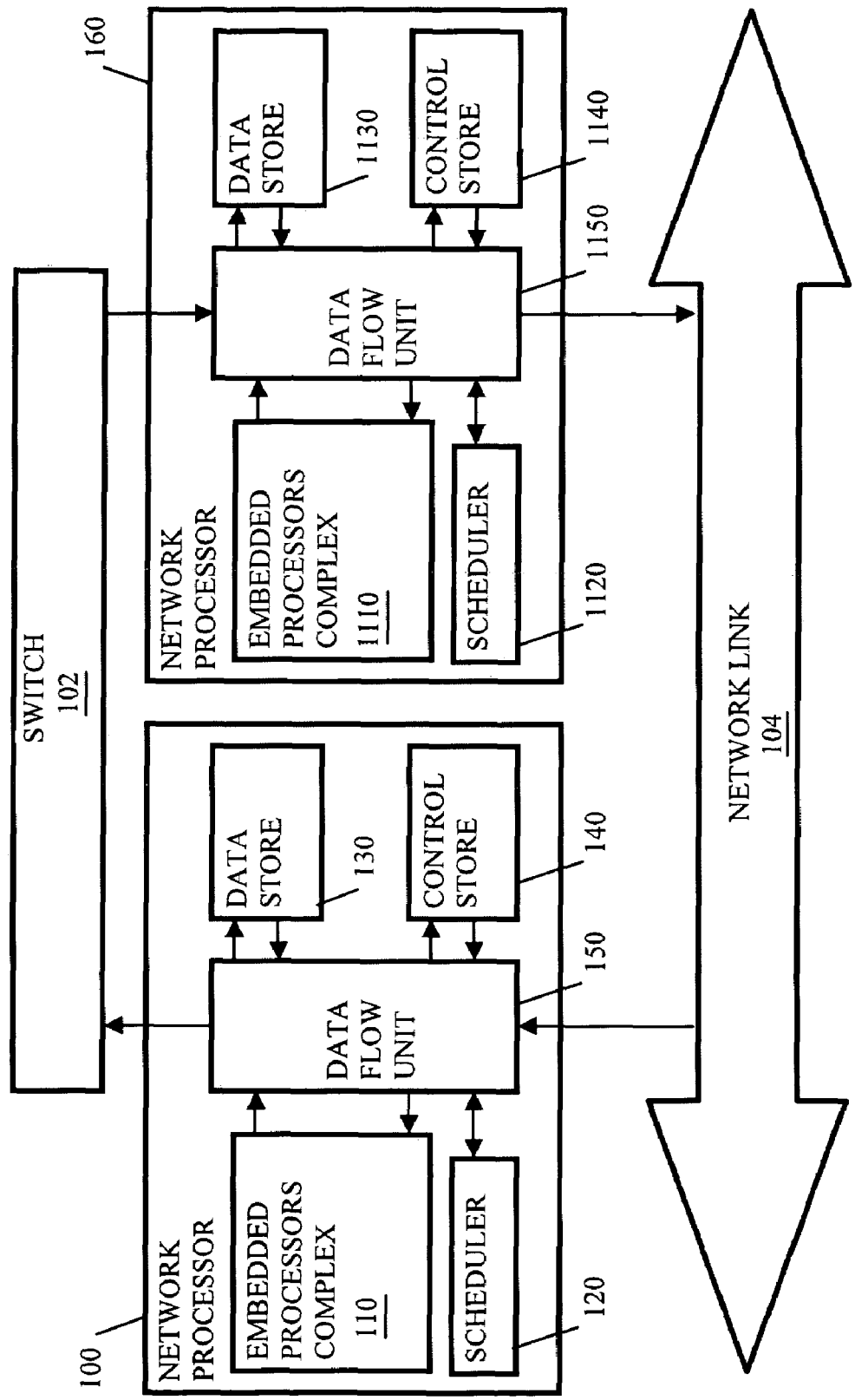
FIG. 1 depicts a plurality of network processors serving a network; each network processor comprising a data flow unit, and embedded processors complex, a scheduler, and control and data stores.

FIG. 1 shows an embodiment of a plurality of network processors 100 and 160 in a network. A network bus or full duplex network link 104 connected to computers, servers, other network processors, and other equipment in the network provides a stream of packets of data to a data flow unit 150 of network processor 100. Network processor 100 operates in an ingress mode to receive packets from network link 104 and transfer processed packets to a switch 102. Conversely, network processor 160 operates in an egress mode to receive packets from switch 102 and transfer processed packets to network link 104. Thus, a plurality of network processors may provide packets from the link to the switch (ingress) and a plurality of network processors may transfer packets from the switch to the link (egress). An overall purpose of the processors is to route information from a plurality of origination points in the network to a plurality of respective destination points in the network.

Data flow unit 150 receives packets of data from network link 104, and for each packet, forms a frame control block (FCB). Data flow unit 150 also writes each packet to a data store 130 implemented in DRAM. An FCB for a packet contains information about the packet. This information includes the size of the packet and where the packet is stored in data store 130. The FCB also contains a pointer to the next FCB in a chain of FCBs corresponding to one of a plurality of flow queues to which the packet belongs. Each FCB is stored in a control store 140 implemented in DRAM. Thus, the pointer to the next FCB points to an address of control store 140 where a next FCB in a chain is stored. The FCB provides a mechanism to keep track of a packet within the network processor and preserve an order in which it is received relative to other packets.

The network processor enqueues each FCB into one of a plurality of queues processed by an Embedded Processor Complex (EPC) 110. EPC 110 reads the frame pointer from the FCB and issues a read request to obtain frame data from the location in data store 130 pointed to by the frame pointer. EPC 110 processes the header of the frame in one of a plurality of pico-processors in EPC 110. Multiple pico-processors enable simultaneous processing of multiple flow queues. The pico-processors of EPC 110 perform network processing functions including filtering, classification and forwarding. During frame processing, EPC 110 can issue requests to a memory arbiter in data flow unit 150 to read and write parts of the frame from and to data store 130. Once EPC 110 processes the frame data, the processed frame data may be temporarily stored in data store 130.

When EPC 110 completes processing of a frame processing, EPC 110 passes the FCB to data flow unit 150. Data flow unit 150 enqueues the FCB into one of a plurality of flow queues of scheduler 120. Scheduler 120 selects the frame from a queue for transmission by passing the frame pointer of the FCB to the data flow unit. The frame pointed to by the frame pointer is read from data store 130 by data flow unit 150. Data flow unit 150 may modify the frame of packet data, and then transmit the modified packet out of the network processor. Thus, scheduler 120 is configured to schedule frames of data to be transmitted from network processor 100 to switch 102.

Similarly, network processor 160 provides an egress from the switch to the network. FIG. 1 shows elements of processor 160 corresponding to like-named, similarly-numbered elements of network processor 100. The description of the elements of network processor 100 applies to the like-named, similarly-numbered elements of network processor 160. Thus, network processor 160 comprises an EPC 1110, a scheduler 1120, a data store 1130, a control store 1140, and a data flow unit 1150. The data flow unit of network processor 160 receives packets from switch 102 and forms FCBs for the received packets as they are received. The packet data is stored in the data store and the FCBs are stored in the control store. The EPC processes the packets, and the scheduler schedules the processed packets for transmission to network link 104.

Figure 1A:
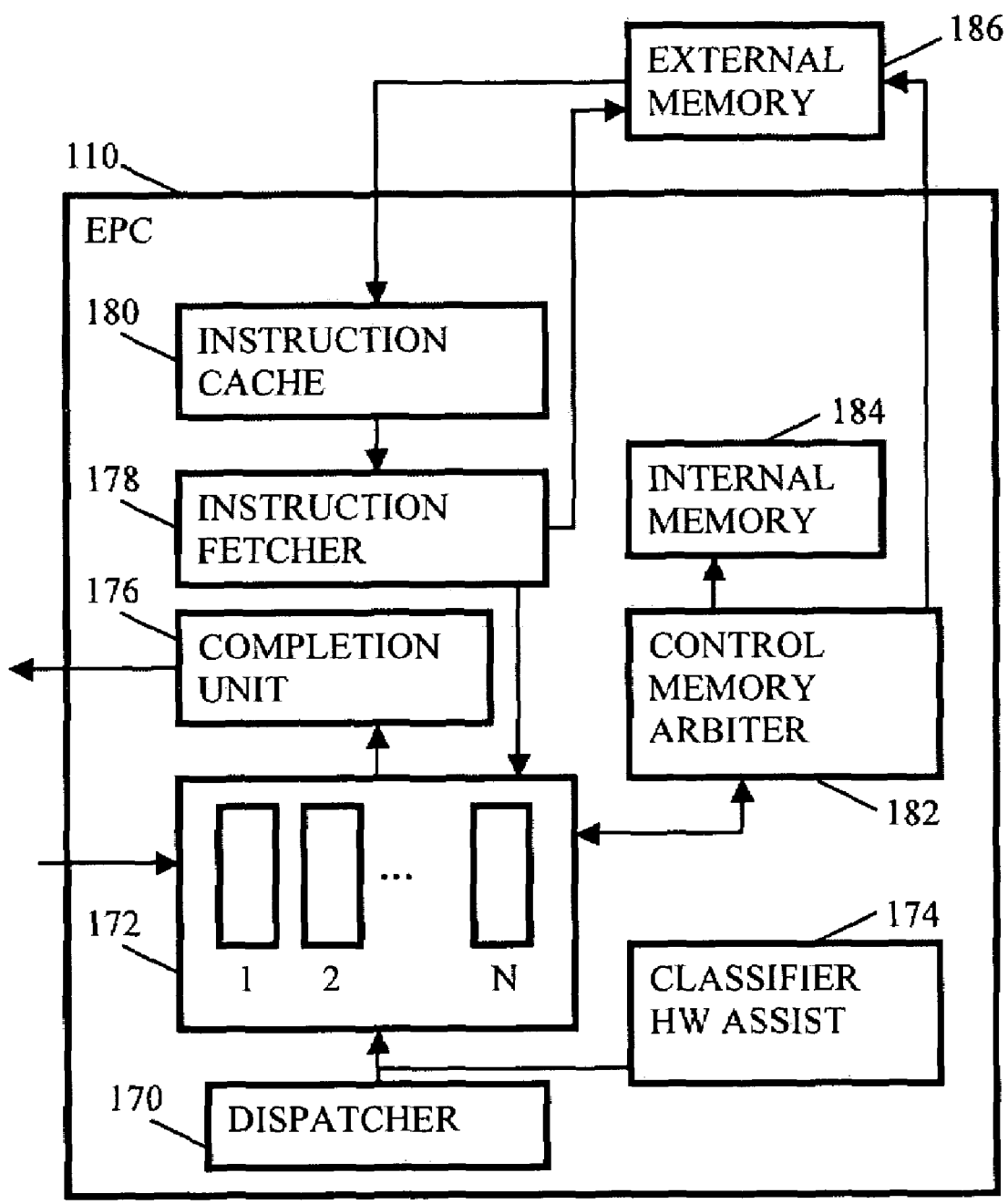
FIG. 1A depicts an embodiment of an embedded processor complex, with a plurality of processors operating in parallel to process packet data.

FIG. 1A shows a simplified block diagram of an Embedded Processors Complex EPC 110. EPC 110 receives frames from a data store and temporarily stores them before they are dispatched to an idle one of a plurality of parallel processors 172 by a dispatcher 170. When dispatcher 170 recognizes that a frame has been received by EPC 110, it finds one of the processors 172 that is available to receive frame data for processing. Processors 172 operate on different frames in parallel and dispatcher 170 attempts to keep as many processors busy processing frames as possible. Moreover, each processor of processors 172 is pipelined to enhance performance. For example, each processor may include a 3-stage pipeline (fetch, decode and execute). Processors 172 further comprise general purpose registers, special purpose registers, a dedicated arithmetic logic unit (ALU) and coprocessors. Further, a processor may comprise a primary data buffer, a scratch pad data buffer and control registers for data store operations.

Concurrently with dispatching a frame to one of processors 172, a classifier hardware assist 174 identifies the type of message format and identifies key information about the packet such as starting address, and header location. Processors 172 receive instructions from an on-chip instruction cache 180. Instruction cache 180 receives instructions from a memory 186 external to EPC 110 such as a system memory implemented in Random Access Memory (RAM). Ideally, instructions that are executed over and over again—i.e., steady state code—are kept in the instruction cache, to minimize long latency external memory reads.

Thus, EPC 110 may comprise an instruction fetcher 178 to initiate a transfer of instructions from external memory 186 to I-cache 180. The place in the cache to where an instruction is transferred from external memory 186 is determined by an index determined from the external memory address of the instruction. The index is the address of a cache entry. With each instruction stored in the cache, a tag determined from the external memory address is also stored. The tag identifies the instruction stored at the cache entry. In an n-way associative cache, there are n locations to store an instruction within a cache entry. To determine which one of the n-locations stores the instruction called for by the program counter of the instruction fetcher, a tag comparator within the instruction fetcher compares the tag from the program counter to the tag of each instruction at the cache entry until the correct instruction is found.

Each frame received by EPC 110 has identifying information such as a message number, a source address, and a destination address. The location and content of this information in a header of the frame data depends on the packet format. A processor must determine the identifying information in the frame, and determine the routing requirements of the packet. The frame header information allows the network processor to properly route the frame with other processed frames so that a completed message is received at an intended destination. Frames that have common identifying information form a "flow" and processors 172 simultaneously process a plurality of flows.

Processors 172 can also performing filtering of packets, enforcing hundreds or more frame filter rules with complex range and action specifications. For example, filter rules can deny or permit a frame or allocate quality of service (QoS) based on IP header information. Filtering is essential for network security, and hardware assist 174 provides wire-speed enforcement of these complex rule sets.

Processors 172 send processed packets to a completion unit 176. While maintaining frame sequence, completion unit 176 passes processed frames to data flow unit 150. EPC 110 further comprises a control memory arbiter 182 to arbitrate requests for control memory by processors 172. Control memory may comprise internal memory 184 and external memory 186. Control memory stores tables, counters, and other data used by processors 172.

Figure 2:
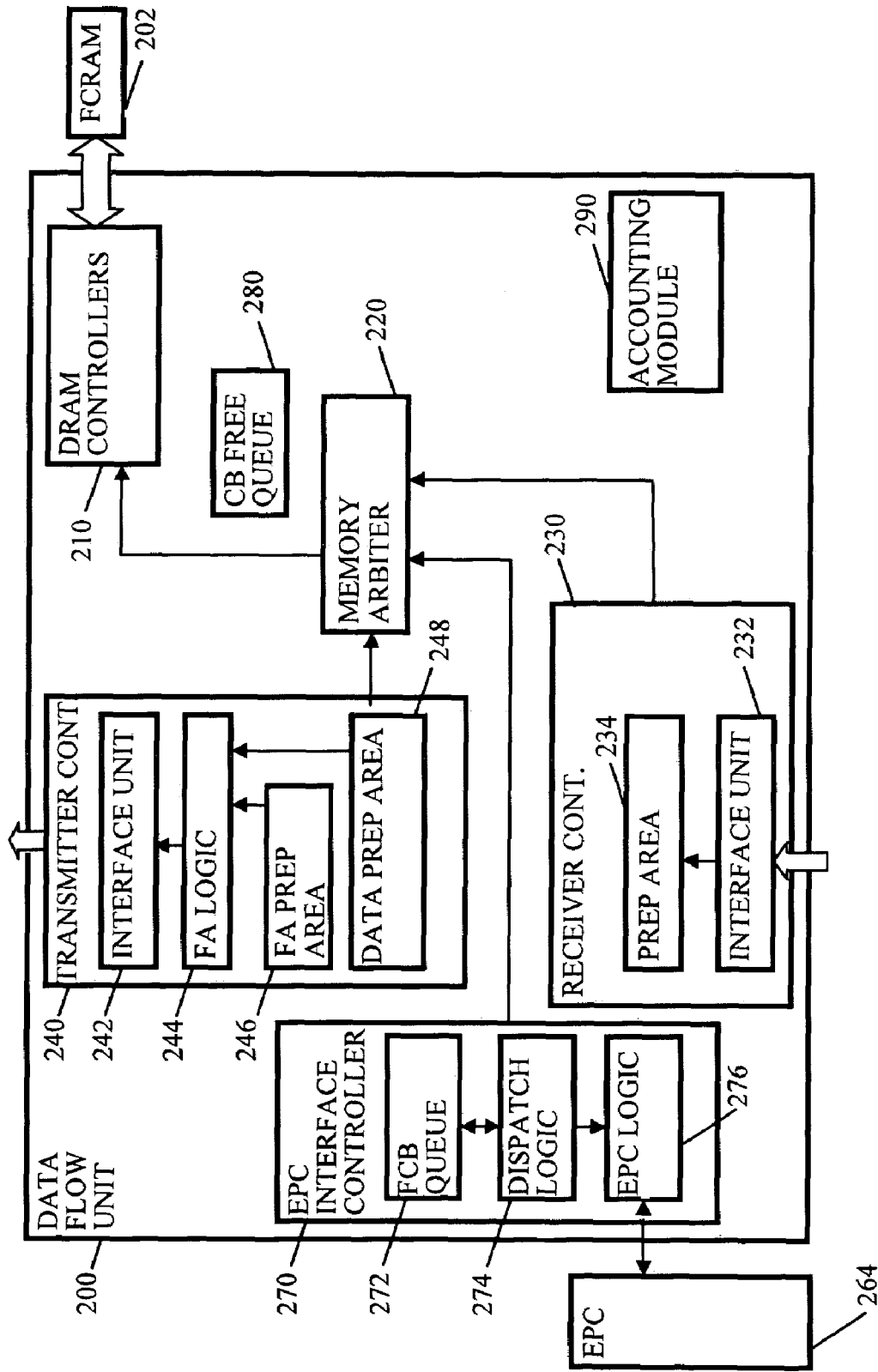
FIG. 2 depicts an embodiment of a data flow unit comprising a receiver controller, a transmitter controller, and an EPC interface controller.

FIG. 2 shows a block diagram of an embodiment of a data flow unit 200 and memory system 202. Memory system 202 is implemented in a type of DRAM called Fast Cycle RAM (FCRAM). The FCRAM forming memory system 202 can be divided into a data store for storing frame data and a control store for storing FCBs. Moreover, memory system 202 can be organized into slices. Each slice comprises a plurality of buffers to store frames of packet data in the data store or FCBs in the control store. DRAM controllers 210 control the reading of data from the FCRAM 202 and the writing of data to FCRAM 202. In one embodiment, DRAM controllers 210 control the transfer of 16 bytes per read or write request.

A memory arbiter 220 interfaces the data flow chip to memory system 202. Memory arbiter 220 receives write requests from a receiver controller 230 to write packet data to a data store of memory system 202 and to write FCBs to a control store of memory system 202. Memory arbiter 220 receives read requests from a transmitter controller 240 to read FCBs from the control store and to read packet data from the data store. Memory arbiter 220 also receives read and write requests from an EPC interface controller 270. EPC Interface controller 270 controls transfers of FCBs and packet data from memory system 202 to an embedded processors complex, EPC 264. EPC interface controller 270 also controls transfer of FCBs from EPC 264 to transmitter controller 240 and controls transfers of processed packet data to system memory 202.

Memory arbiter 220 receives the read and write requests from EPC interface controller 270, receiver controller 230, and transmitter controller 240, and schedules access to memory system 202. Frame data is written to different buffers distributed over different memory slices to make good use of memory bandwidth. In one embodiment, data is read from the FCRAM in 16-byte increments, with each buffer in a slice having 16 bytes. Similarly, data is written in 16 byte increments.

Receiver controller 230 receives and temporarily stores data from a link or switch. In an ingress mode, receiver controller 230 receives packet data from a network link. In an egress mode, receiver controller 230 receives packet data from a switch. Receiver controller 230 receives packets through an interface unit 232. Interface unit 232 is adaptable to receive packet data from a switch or a link. When a packet is received from interface unit 232, it is first stored in a preparation area 234, while a frame control block is obtained for the packet. As packets are received, receiver controller 230 issues write requests to memory arbiter 220 to write received packet data into individual buffers of a data store segment of memory system 202. Receiver controller 230 also issues write requests to write FCBs to the control store.

Receiver controller 230 temporarily stores packets received from interface unit 232 in a preparation area memory 234 prior to storing the packet data in a data store of memory system 202. While data is temporarily stored in preparation area 234, receiver controller 230 may dequeue FCBs from a Control Block (CB) free queue 280. CB free queue 280 may store convenient number of FCBs not associated with any packet and provides a store of available FCBs to associate with packets as they are received. CB free queue 280 may be organized into frame control blocks and groups of frame control blocks may be organized into a Table Control Block (TCB). Each available FCB obtained from CB free queue 280 has a pointer to the address of the next free FCB in the free queue. When a packet is transmitted, its FCB is returned to CB free queue 280.

Each FCB includes a frame pointer that points to a memory location in the data store where the frame of packet data corresponding to the FCB is stored. Upon obtaining the FCB, receiver controller 230 issues a write request and transfers the packet to memory system 202 at the location determined by the frame pointer of the FCB. A copy of the FCB is stored in a control store of memory system 202. Each FCB in the control store contains a pointer to the control store location that contains the next FCB in the queue to form a chain of linked frame control blocks.

EPC Interface controller 270 comprises dispatch logic 274 to de-queue FCBs from a local FCB queue 272 which receives FCBs from the control store in memory system 202. Once dispatcher logic unit 274 dequeues the next FCB from FCB queue 272, dispatcher logic unit 274 issues a read request to memory arbiter 220 to obtain the frame header data of the packet. Thus, EPC 264 reads the frame pointer in the FCB and retrieves the frame header from the data store of memory system 202 at the location pointed to by the frame pointer. EPC 264 processes the frame header and issues a write request to memory arbiter 220 to write the processed frame data to the data store in memory system 202. Once EPC 264 processes the frame data, an EPC logic unit 276 issues the FCB associated with the processed frame to scheduler 120 or 1120.

Transmitter controller 240 comprises a data preparation area 248, a frame alteration command preparation area 246, frame alteration (FA) logic 244, and an interface unit 242. Data preparation area 248 comprises a relatively small amount of memory to store frame data prior to transmission to a switch or data link port by way of interface unit 242. Frame alteration command preparation area 246 receives commands from EPC 264 to effect modification of a frame. Frame alteration logic 244 receives a frame of data from data preparation area 248 and applies it to logic circuitry operating under the control of commands from FA preparation area 246. Thus, data flow unit 200 de-queues an FCB and reads the frame pointer. Data preparation area memory 248 receives the data from the data store location of memory system 202 that is pointed to by the dequeued FCB. Frame modification commands from EPC 264 are received by FA preparation area 246. These commands control FA logic 244 to alter the frame data before it is passed to interface unit 242.

Data Flow unit 200 further comprises an accounting module 290 to perform basic accounting functions. For example accounting 290 may count packets received, processed and transmitted in each of a plurality of flow queues. Each time accounting module 290 performs a count of a packet, an appropriate counter value must be read from a memory, incremented, and written back to the memory. Since there may be a very large number, perhaps, over a million, flow queues, accounting module 290 must implement a very large number of counters. Consequently, a very large number of counter values must be stored in a memory. Moreover, each counter value memory location may be 32 bits wide. For this reason, memory storage of these counter values in DRAM or other cost effective memory is desirable.

Table 1 shows a possible sequence of counter memory accesses for counter value storage implemented in DRAM.

TABLE 1

| 1  | 2  | 3  | 4  | 5  | 6  | 7  | 8  | 9  | 10 |
|----|----|----|----|----|----|----|----|----|----|
| R1 | R2 | R3 | R4 | R5 | R1 |    |    |    |    |
|    |    | M1 | M2 | M3 | M4 | M5 |    |    |    |
|    |    |    |    | W1 | W2 | W3 | W4 | W5 |    |

In a first cycle, the processor begins to read a value of a first counter. This is denoted by R1 (read value of counter 1) in column 1. In a second cycle, the processor begins to read the value of counter 2 (R2, column 2), etc. In a third cycle, the value read for counter 1 is modified by incrementing it by 1. (M1, column 3). During cycle 5, the incremented first counter value is written back to its place in memory. (W1, column 5). Thus, the new counter value is ready to be read from memory by cycle 6. Thus, so long as the periodicity of counter updates is longer than the Read-Write-Modify cycle, counter updates can proceed.

A problem arises when a counter must be updated before a previous update is completed. This is shown in Table 2.

TABLE 2

| 1  | 2  | 3  | 4  | 5  | 6  | 7  | 8  | 9  | 10 |
|----|----|----|----|----|----|----|----|----|----|
| R1 | R2 | R1 | R3 | R1 | R1 |    |    |    |    |
|    |    | M1 | M2 | M1 | M3 | M1 |    |    |    |
|    |    |    |    | W1 | W2 | W1 | W3 | W1 |    |

In this sequence of counter value memory accesses, an attempt to read a first counter value from memory during cycle 3 (R1, column 3) will occur before the new value of the counter resulting from the read initiated during cycle 1 (R1, column 1) is written. This is so because the new value resulting from the read of cycle 1 is not written until cycle 5 (W1, column 5). Thus, if the periodicity of counter use is shorter than the R-W-M (Read-Write-Modify) cycle, then read accesses attempt to access counter values that have not yet been updated.

Figure 3:
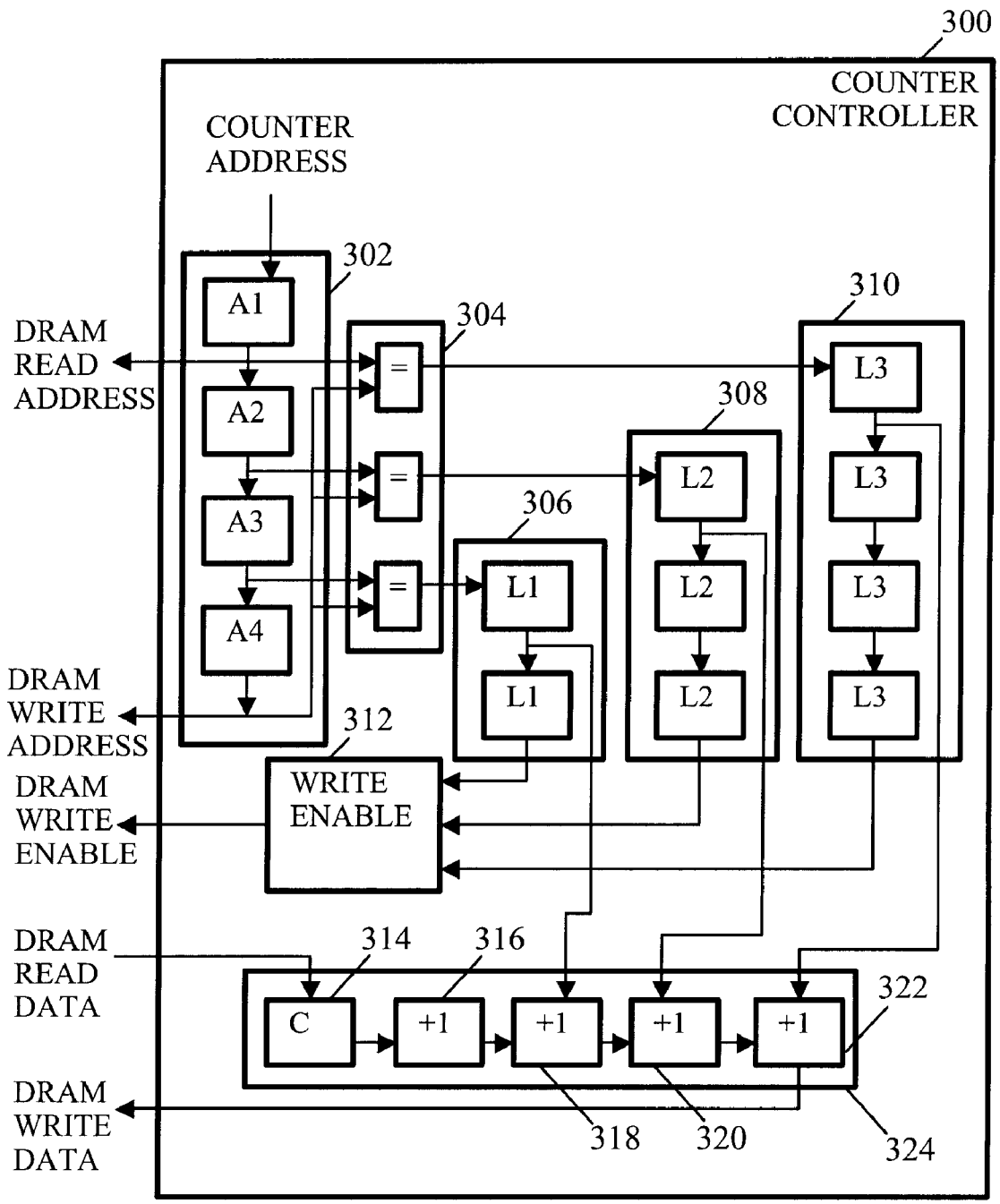
FIG. 3 depicts a counter control circuit for counting in a network processor.

FIG. 3 shows a counter controller 300 to enable counting of packets in a network processor using cost effective memory such as DRAM. Counter controller 300 may be implemented in accounting module 290 of data flow unit 200. Counter controller 300 comprises a set of address registers 302, labeled A1 through A4 in FIG. 3. When a counter is to be updated, counter controller 300 receives the address of the memory location containing the current value of the counter. The received counter address is placed in the first address register A1. The output of the first address register A1 is a read address for addressing a memory location in DRAM to read a counter value. The output of the fourth address register A4 is a write address for writing a new counter value to DRAM.

In each cycle of operation, a counter value memory address received into register A1 advances to the next register. Thus, in a first cycle, register A1 receives a read address and outputs the read address to initiate a memory read from the addressed memory location in DRAM. In a second cycle, next subsequent to the first cycle, the address in register A1 latches into register A2, and so forth. At cycle 4, the address that was the read address in the first cycle is output by register A4 as the write address in cycle 4. Thus, in this embodiment, a read and modify operation must occur and be stable to enable a write of the result within four cycles. If more cycles are required for the Read-Modify-Write operation, then more than four registers 302 are required. Thus, the number of registers shown in FIG. 3 is representative of the process, but the invention is not limited to four address registers.

Counter controller 300 retrieves from DRAM the data that is stored at the location addressed by the output of register A1, copies the read data into a register C, 314, of a counter value modifier 324. The content of register C passes to an incrementing pipeline comprising incrementers 316, 318, 320, and 322. There may be as many incrementers as there are address registers. Incrementer 316 increments the value from register C once. Incrementer 318 may increment the output of incrementer 316. And so forth. Thus, the value written into register C is incremented at least once, and may be incremented twice, three times or four times. Whether, extra increments are applied depends on whether an attempt to update the counter occurred during the four cycles that an address applied to register A1 propagates to the output of register A4.

Counter controller 300 further comprises a bank of address comparators 304. A first one of address comparators 304 compares the address output by register A4 to the address output by register A1 and outputs a logical one only if the addresses are the same. A second one of address comparators 304 compares the address output by register A4 to the address output by register A2 and outputs a logical one only if the addresses are the same. The third one of the address comparators compares the address output by register A4 to the address output by register A3 and outputs a logical one only if the addresses are the same. When the address output by register A4 matches an address output by one of registers A1, A2, or A3, the network processor has attempted to update the counter addressed by the output of register A4 during the R-W-M of the counter addressed by the output of register A4.

To incorporate these attempted updates into the counter value, the results of the comparators are sent to incrementers 318, 320 and 322. Accordingly, the output of the third one of comparators 304 is input to a first one of a first set of latches 306 labeled L1. The output of the second one of comparators 304 is input to a first one of a second set of latches 308 labeled L2. The output of the first one of comparators 303 is input to a first one of a third set of latches 310 labeled L3. In each cycle of operation the logical result of a comparator received by a set of latches advances through the pipeline formed by the latches.

The output of a first one of each set of latches, L1, L2, and L3. is input to a respective one of incrementers 318, 320 and 322. If the output of a latch received by an incrementer is true, then the respective one of the incrementers increments the value received in the incrementer pipeline from register C. If the output of a latch received by an incrementer is not true, then the respective one of the incrementers does not increment the value received in the incrementer pipeline from register C. At the end of each pipeline of latches, the output of the pipeline passes to a write enable unit 312. If the value from a latch is true, the write unit issues a write disable signal to prevent data from being written to the counter memory location addressed by the output of buffer A4.

The operation of the circuitry of FIG. 3 may be understood more clearly with reference to a hypothetical sequence of counter updates received by controller 300. Table 3 shows such a hypothetical sequence.

TABLE 3

|    | 1  | 2  | 3  | 4  | 5  | 6  | 7  |
|----|----|----|----|----|----|----|----|
| A1 | a1 | a2 | a1 | a3 |    |    |    |
| A2 |    | a1 | a2 | a1 | a3 |    |    |
| A3 |    |    | a1 | a2 | a1 | a3 |    |
| A4 |    |    |    | a1 | a2 | a1 | a3 |

In cycle 1, (column number 1), address register A1 (row A1) receives an address a1 to update a first counter having a counter value stored in memory location a1. In cycle 2, (column number 2), address register A1 receives an address a2 to update a second counter having a counter value stored in memory location a2. Meanwhile, address a1 advances to address register A2 (row 2). In cycle 3 (column number 3), address register A1 receives the address a1 to update counter 1. And so forth. The counter memory address a1 received by address register A1 in cycle 1 is not output from address register A4 until cycle 4 (column number 4, row A4). Thus, a request to update counter 1 is received in cycle 3 before the counter is updated by the update request received in cycle 1.

An object of counter controller 300 is to cause the update of the value addressed by memory address a1 in cycle 1 to incorporate two increments: one increment for the first update request received in cycle 1 (column 1, row A1), and one increment for the update request received in cycle 3 (column 3, row A1). In cycle 4, a comparison of the address of register A2 with the address of register A4 will produce a match. This is how the machine determines that an update request has been received after an initial update request but before writing to memory in response to the initial update request. The result of the comparison of address registers A2 and A4 is received and output by a first latch of the second set of latches 308. The output of the first of the set of latches 308, which is true, passes to incrementer 320 to cause incrementer 320 to increment the value it receives from the register C pipeline. Thus, the value register C receives is incremented twice, as it should be. The counter controller then writes the properly incremented value to the DRAM at address a1 in cycle 4.

Now it is necessary to cancel the write that would otherwise occur as a result of the update request for counter 1 received in cycle 3. Since the write that follows in response to the update request of cycle 3 occurs in cycle 6, write enable unit 312 must issue a write disable in cycle 6 to disable the data read as a result of the update request of cycle 3 from being written to memory. Accordingly, the result of A4 compared to A2 in cycle 4, which is true, passes from the first latch of latches 308 to the subsequent two latches in cycles 5 and 6. Write enable unit 312 receives the signal from latch pipeline 308 in cycle 6 and forces a write-disable in cycle 6.

Figure 4:
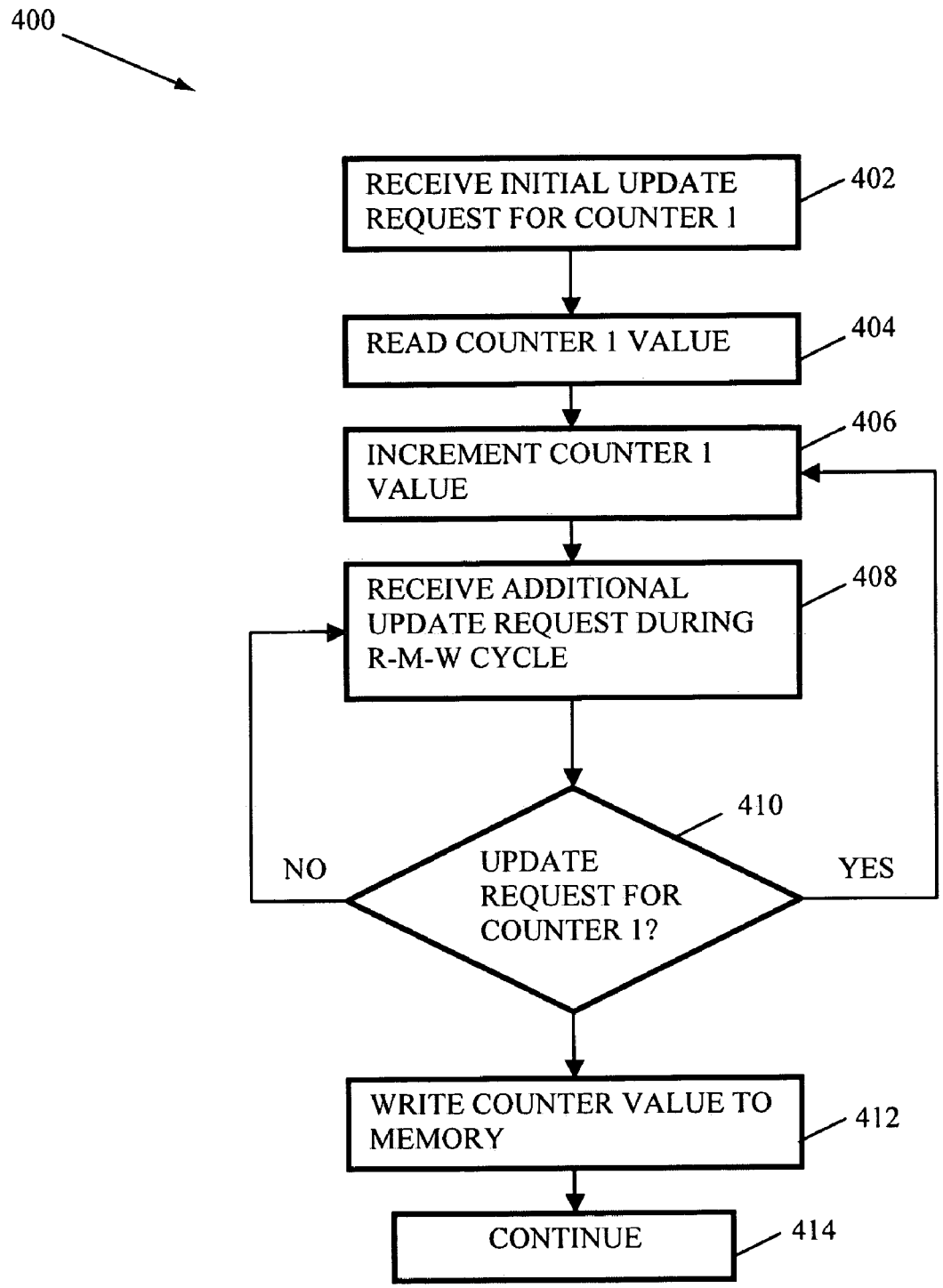
FIG. 4 depicts a flow chart of an embodiment for updating counters in a network processor.

FIG. 4 shows a flow chart 400 of an embodiment for counting update requests. When an initial update request to update a counter 1 is received (element 402), a counter controller reads the current value of the counter from memory (element 404). The counter controller increments the value read from memory (element 406). The counter controller receives additional update requests during the Read-Modify-Write cycle (element 408). If an additional update request for counter 1 is received during the R-M-W cycle (element 410) then the counter value is incremented again (element 406). If, however, an additional request is not received (element 410) additional requests are received during the R-M-W cycle (element 408). When the R-M-W cycle is over, the counter controller writes the counter value to memory (element 412) and the process continues (element 414).

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A counting mechanism in a network processor, comprising:
    a plurality of address registers sequentially connected to form an address pipeline to sequentially receive addresses; each received address giving a memory location to store a value of a counter; the address pipeline comprising a register that outputs a received address as a read address at a beginning of the address pipeline and a register that outputs the address as a write address at an end of the address pipeline;
    a plurality of incrementing registers sequentially connected to form a counter pipeline to sequentially receive counter values; each incrementing register forming a stage for incrementing a counter value and each counter value in the counter pipeline incremented at least one time;
    a plurality of comparators, one at each internal stage of the address pipeline, to perform address comparisons to determine if the write address matches one or more addresses in the address registers of the address pipeline, each comparison performed by a comparator providing a control signal to control whether to increment a counter in a corresponding stage of a counter pipeline; and
    a counter value modifier comprising the counter pipeline to increment a counter value from the read address once plus once for each address match determined by the comparators to produce an incremented counter value, and wherein a stage in the counter pipeline where an increment occurs is determined by a stage of the address pipeline where a match occurs.

2. The counting mechanism of claim 1, further comprising a plurality of sets of sequential latches, the number of latches in a set determined by an address pipeline stage where a match occurred, each set to receive an output from a different one of the comparators and to determine when to disable writing of a counter value based on a time of receipt of a comparator output indicating an address match.

3. The counting mechanism of claim 2, wherein the counter modifier is adapted to receive outputs from the latches and to increments a value in the counter value modifier at a counter incrementing stage determined by the address pipeline stage where the match occurred.

4. The counting mechanism of claim 1, further comprising a write enable unit to receive multiple control signals from the comparator outputs and to disable writing to memory during a time determined by a time of receipt of a comparator output indicating an address match.

5. The counting mechanism of claim 1, wherein a number of counter incrementing registers in the counter pipeline is equal to or greater than a number of stages required for performing a read operation, incrementing a counter value at least twice, and performing a write operation.

6. A network processor for processing packets of data, comprising:
    a data flow unit to receive packets of data, and for each packet, to determine a flow queue to which the packet belongs, and to transmit processed packets;
    an embedded processors complex comprising a plurality of processors to process packet data; and
    a counter value memory for storing counter values;
    a counter for counting packets received in each of a plurality of flow queues, comprising:
    an address pipeline to receive counter value addresses and to issue an address as a read address at a first stage of the pipeline and as a write address at a later stage of the pipeline;
    a counter pipeline with a plurality of incrementing registers to increment each counter in the pipeline at least once;
    a plurality of comparators to perform address comparisons to determine if the write address matches one or more addresses in address registers of the address pipeline, each comparison performed by a comparator providing a control signal to control whether to increment a counter; and a counter value modifier comprising the counter pipeline for incrementing a counter value from the read address once plus once for each address match determined by the comparators to produce an incremented counter value, and wherein a stage in the counter pipeline where an increment occurs is determined by a stage of the address pipeline where a match occurs.

7. The network processor of claim 6, further comprising a write enable unit to receive multiple control signals from the comparators and to disable writing during a time determined by a time of receipt of a comparator output indicating an address match.

8. The network processor of claim 6, further comprising a data store to store packets of data received by the network processor.

9. The network processor of claim 8, wherein the data store and the counter value memory are implemented in DRAM.

10. The network processor of claim 6, wherein the counter further comprises a plurality of sets of sequential latches, the number of latches in a sequence determined by a stage of the address pipeline at which a comparison occurred, each set to receive an output from a different one of the comparators and to determine when to disable writing of a counter value based on a time of receipt of a comparator output indicating an address match.

11. The network processor of claim 10, wherein the counter value modifier is adapted to receive outputs from each set of latches and increments a value in the counter value modifier at a counter stage determined by the address pipeline stage where the match occurred.

12. The network processor of claim 6, wherein the counter value modifier is adapted to receive outputs from the comparators and increments a value in the counter value modifier at a counter stage determined by an address pipeline stage where a match occurred.

13. The network processor of claim 6, wherein a number of counter incrementing stages in the counter pipeline is equal to or greater than a number of stages required for performing a read operation, incrementing a counter value at least twice, and performing a write operation.

14. A method for accounting in a network processor, comprising:

forming an address pipeline comprising a plurality of address registers;

forming a counter pipeline comprising a plurality of incrementing registers;

sequentially receiving into the address registers of the address pipeline a sequence of counter value addresses;

issuing a received counter value address as a read address in one stage of the address pipeline and as a write address in a later stage of the address pipeline;

reading a counter value from a memory location indicated by the read address;

determining by a comparator for each of a plurality of stages in the address pipeline, an address that matches the write address, a comparison performed by a comparator providing a control signal to control whether to increment a counter;

incrementing in the counter pipeline the counter value read from memory at least once plus once for each match determined, wherein a stage in the counter pipeline where an increment occurs is determined by a stage of the address pipeline where a match occurs; and writing the incremented counter value to the memory location.

15. The method of claim 14, further comprising passing a comparator output through a sequence of latches, the number of latches in a sequence determined by a stage of the address pipeline at which a comparison occurred, to determine a time to disable writing of a counter value based on a time of receipt of a comparator output indicating an address match.

16. The method of claim 15, wherein incrementing a counter value comprises incrementing the counter value in a stage of the counter pipeline at a time and in a counter pipeline stage determined by a time of receipt of a comparator output indicating an address match.

17. The method of claim 14, wherein incrementing a counter value comprises incrementing a counter in a stage of the counter pipeline at a time and in a counter pipeline stage determined by a time of receipt of a comparator output indicating an address match.

18. The method of claim 14, wherein a number of incrementing registers in the counter pipeline is equal to or greater than a number of stages required for performing a read operation, incrementing a counter value at least twice, and performing a write operation.

19. The counting mechanism of claim 1, wherein each comparison in each of a plurality of stages of the address pipeline provides a control signal that controls whether and when to disable a write operation to memory.

20. The network processor of claim 6, wherein each comparison in each of a plurality of stages of the address pipeline provides a control signal that controls whether and when to disable a write operation to memory.

* * * * *